(12) United States Patent
Wu (10) Patent No.: US 11,124,215 B2
(45) Date of Patent: Sep. 21, 2021

(54) FOLDING SHOPPING CART WITH STABLE STRUCTURE

(71) Applicant: ZheJiang Nasite Commodity Co., LTD, Jiaxing (CN)

(72) Inventor: Ziying Wu, Hangzhou (CN)

(73) Assignee: ZheJiang Nasite Commodity Co., Ltd.

( * ) Notice: Subject to any disclaimer, the term of this patent is extended or adjusted under 35 U.S.C. 154(b) by 12 days.

(21) Appl. No.: 16/714,016

(22) Filed: Dec. 13, 2019

(65) Prior Publication Data

US 2021/0179156 A1 Jun. 17, 2021

(51) Int. Cl.
*B62B 3/02* (2006.01)

(52) U.S. Cl.
CPC .................... *B62B 3/027* (2013.01)

(58) Field of Classification Search
CPC .................................................. B62B 3/027
See application file for complete search history.

(56) References Cited

U.S. PATENT DOCUMENTS

| | | | | |
|---|---|---|---|---|
| 3,191,956 A * | 6/1965 | Rizzuto | ..................... | B62B 5/02 280/641 |
| 3,207,526 A * | 9/1965 | Brodeck | ................... | B62B 1/12 280/652 |
| 3,236,536 A * | 2/1966 | Shore | ...................... | B62B 1/12 280/652 |
| 3,310,317 A * | 3/1967 | Luff | ......................... | B62B 1/12 280/652 |
| 4,765,646 A * | 8/1988 | Cheng | ..................... | B62B 3/022 280/651 |
| 5,090,724 A * | 2/1992 | Fiore | ...................... | B62B 5/082 280/47.38 |
| D343,040 S * | 1/1994 | Wilson | ......................... | D34/17 |
| 5,294,158 A * | 3/1994 | Cheng | ..................... | B62B 3/02 280/641 |
| 5,328,182 A * | 7/1994 | Kuo | ......................... | B62B 5/02 280/47.21 |
| 7,246,814 B2 * | 7/2007 | Prather | .................. | B62B 3/027 280/33.995 |
| 8,733,786 B1 * | 5/2014 | James | .................... | B62B 3/025 280/651 |
| 8,764,045 B1 * | 7/2014 | Kossowsky | ............ | B62B 3/005 280/651 |
| D721,464 S * | 1/2015 | Darvish | ....................... | D34/27 |
| 9,352,764 B1 * | 5/2016 | Kossowsky | ............ | B62B 3/027 |
| 9,457,825 B1 * | 10/2016 | Devers | .................. | A47G 25/06 |
| 2002/0167139 A1 * | 11/2002 | Prather | .................. | B62B 3/146 280/47.35 |
| 2002/0171214 A1 * | 11/2002 | Prather | .................. | B62B 3/142 280/47.35 |

(Continued)

*Primary Examiner* — Erez Gurari (57) ABSTRACT

A folding shopping cart with a stable structure comprising a shopping cart basket, sliding wheels and a cart frame; the shopping cart basket comprises a front plate, a back plate and a bottom plate, wherein one end of the bottom plate is hinged to the bottom end of the front plate, and the other end of the bottom plate is hinged to the bottom end of the back plate; a stop strip is arranged between the side edges of the front plate and the back plate, wherein one end of the stop strip is hinged to the front plate, and the other end of the stop strip is hinged to the back plate; the sliding wheel comprises a front wheel shaft assembly and a rear wheel assembly.

9 Claims, 6 Drawing Sheets

(56) References Cited

U.S. PATENT DOCUMENTS

| | | | |
|---|---|---|---|
| 2010/0133769 A1* | 6/2010 | Wu | B62B 3/02 |
| | | | 280/47.18 |
| 2011/0220642 A1* | 9/2011 | Leung | A45C 13/385 |
| | | | 220/6 |
| 2012/0274052 A1* | 11/2012 | Zhu | B62B 3/027 |
| | | | 280/651 |
| 2020/0269898 A1* | 8/2020 | Frankel | B62B 3/027 |

* cited by examiner

FOLDING SHOPPING CART WITH STABLE STRUCTURE

TECHNICAL FIELD OF THE INVENTION

The present invention relates to the technical field of folding shopping carts, and more particularly, to a folding shopping cart with a stable structure.

BACKGROUND OF THE INVENTION

People's consuming habits have changed with society's development. Various shopping modes bring various experiences. Although online shopping becomes popular, it's hard to provide a sufficient shopping experience. Many people still prefer shopping offline, but are required to push a shopping cart in a shopping mall.

Shopping malls have different types of shopping carts. When choosing shopping carts, in order to achieve an easy transportation and storage, the first choice for shopping malls and supermarkets is the folding shopping cart. In the prior art, directional hooks are normally adopted in traditional shopping carts for blocking the handle tubes, thus allowing the shopping carts to be folded or unfolded directionally. During use, when the side surface of the shopping cart is impacted in a completely unfolded state, the directional hooks can easily deform or hook objects, resulting in a poor use experience. Moreover, when assembling the rear wheels of the traditional folding shopping cart, many small accessories need to be assembled and special tools are required, making the assembly difficult.

To solve the aforesaid technical problem, the present invention provides a novel folding shopping cart that has a stable structure when being folded and used.

SUMMARY OF THE INVENTION

The purpose of the present invention is to solve the shortcomings in the prior art by providing a folding shopping cart with a stable structure.

To achieve the above purpose, the present invention adopts the following technical solution:

A folding shopping cart with a stable structure comprising a shopping cart basket, sliding wheels and a cart frame; the shopping cart basket comprises a front plate, a back plate and a bottom plate, wherein one end of the bottom plate is hinged to the bottom end of the front plate, and the other end of the bottom plate is hinged to the bottom end of the back plate; a stop strip is arranged between the side edges of the front plate and the back plate, wherein one end of the stop strip is hinged to the front plate, and the other end of the stop strip is hinged to the back plate; the sliding wheel comprises a front wheel shaft assembly and a rear wheel assembly, wherein the front wheel shaft assembly comprises a front wheel shaft and front wheels arranged at the two ends of the front wheel shaft, and the rear wheel assembly is connected to the bottom end of the shopping cart basket through fixing members; the cart frame comprises two limiting rods, a connecting rod and a supporting rod for supporting the shopping cart basket; the supporting rod is arranged underneath the bottom plate, and is in contact with the lower surface of the bottom plate; the supporting rod is arranged between the two limiting rods, and a connecting member for facilitating the rotation of the limiting rod is arranged between the connecting rod and the limiting rod; the bottom ends of the two limiting rods are fixedly connected to the front wheel shaft, and a rotating pin is connected to the limiting rod and the stop strip.

In another preferred embodiment, the connecting member is provided with a first connecting sleeve and a second connecting sleeve, and the outer wall of the bottom end of the first connecting sleeve is connected with the second connecting sleeve. The first connecting sleeve is perpendicular to the second connecting sleeve, and the first connecting sleeve is sleeved on the outer wall of the limiting rod. The tail ends of the connecting rod are arranged in the second connecting sleeves.

In another preferred embodiment, the position where the first connecting sleeve and the second connecting sleeve are connected is arc-shaped for increasing the connection strength.

In another preferred embodiment, reinforcing ribs are arranged between the outer wall of the second connecting sleeve and the outer wall of the first connecting sleeve.

In another preferred embodiment, a pushing rod is installed at the top end of the two limiting rods, thereby achieving a convenient use.

In another preferred embodiment, side stand columns are arranged on the two sides of the back plate, and the rear wheel assembly is provided with a rear wheel shaft and rear wheels installed at the two ends of the rear wheel shaft. The fixing member comprises a horizontal connecting tube and a vertical connecting tube that is perpendicular to the horizontal connecting tube. The horizontal connecting tube is connected to the rear wheel shaft, and the vertical connecting tube is connected to the side stand column.

In another preferred embodiment, a pin hole is formed in the vertical connecting tube, and a pin penetrates through the pin hole to fix the side stand column in the vertical connecting tube.

In another preferred embodiment, a clamping groove is formed in an inner connecting hole of the horizontal connecting tube, and the rear wheel shaft is provided with a clamping block that is arranged in the clamping groove during installation, thus preventing the rear wheel shaft from rotating in the horizontal connecting tube.

In another preferred embodiment, reinforcing blocks are arranged on the outer walls of the horizontal connecting tube and the vertical connecting tube.

Compared with the prior art, the present invention has the following advantages:

1. After adopting the connecting member of the present invention, the folding shopping cart can be conveniently assembled, and a stable connection can be achieved when the side surface of the shopping cart is impacted. During use, the problem relating to the objects being hooked can be solved;
2. The fixing member of the present invention has a simple structure, can be conveniently installed, can be easily inserted, and has a high stability.

11—Front Plate, 12—Back Plate, 121—Side Stand Column, 13—Bottom Plate, 131—Connecting Rod, 141—Stop Strip, 211—Front Wheel Shaft, 212—Front Wheel, 221—Rear Wheel Shaft, 2211—Clamping Block, 222—Rear Wheel, 31—Limiting Rod, 32—Supporting Rod, 33—Push Rod, 50—Connecting Member, 51—The First Connecting Sleeve, 52—The Second Connecting Sleeve, 53—Reinforcing Rib, 60—Fixing Member, 61—Vertical Connecting Tube, 611—Pin Hole, 62—Horizontal Connecting Tube, 621—Clamping Groove, 63—Reinforcing Block.

DETAILED DESCRIPTION OF THE INVENTION

Drawings and detailed embodiments are combined hereinafter to elaborate the technical solutions of the present invention.

As shown in FIGS. 1-8, the present invention provides a folding shopping cart with a stable structure, which comprises a shopping cart basket, sliding wheels and a cart frame. The shopping cart basket comprises a front plate 11, a back plate 12 and a bottom plate 13, wherein one end of the bottom plate 13 is hinged to the bottom end of the front plate 11, and the other end of the bottom plate 13 is hinged to the bottom end of the back plate 12. A stop strip 141 is arranged between the side edges of the front plate 11 and the back plate 12, wherein one end of the stop strip 141 is hinged to the front plate 11, and the other end of the stop strip 141 is hinged to the back plate 12.

Figure 1:
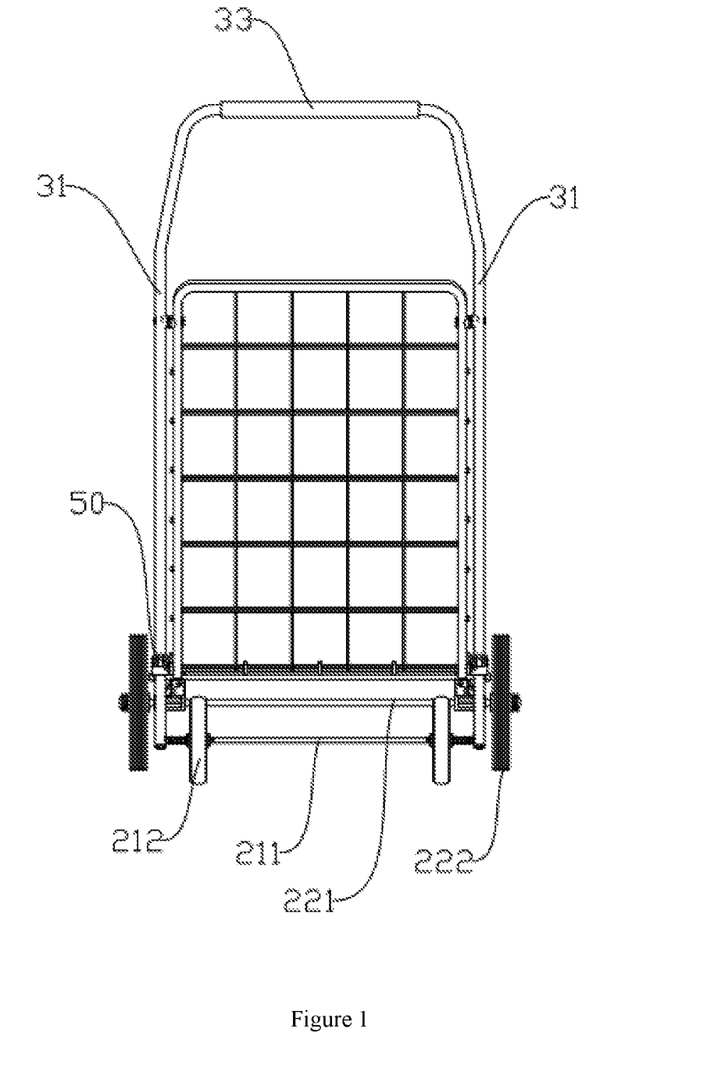
FIG. 1 is a front view of the present invention.
Figure 2:
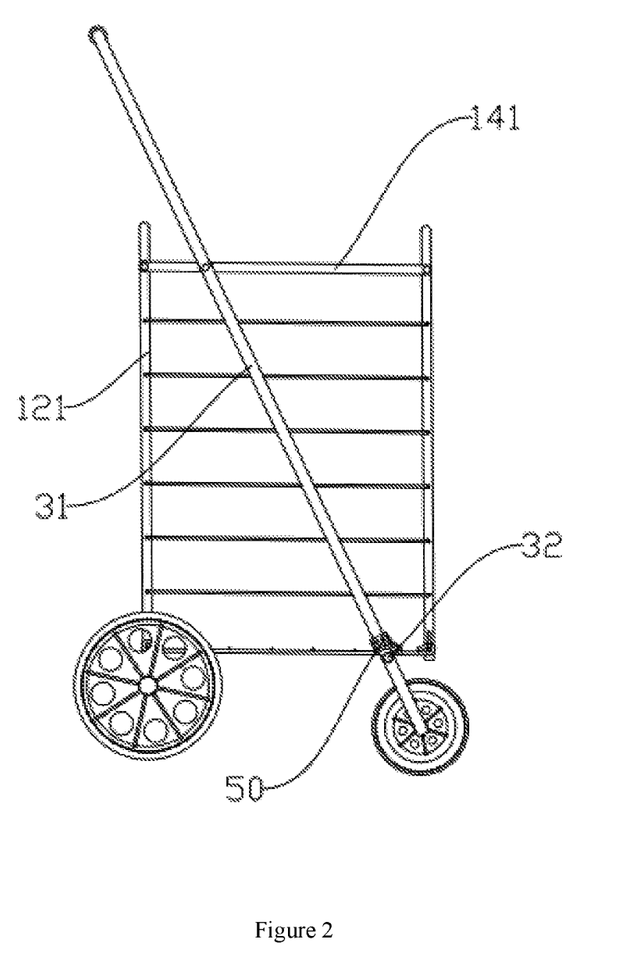
FIG. 2 is a side view of the present invention.
Figure 3:
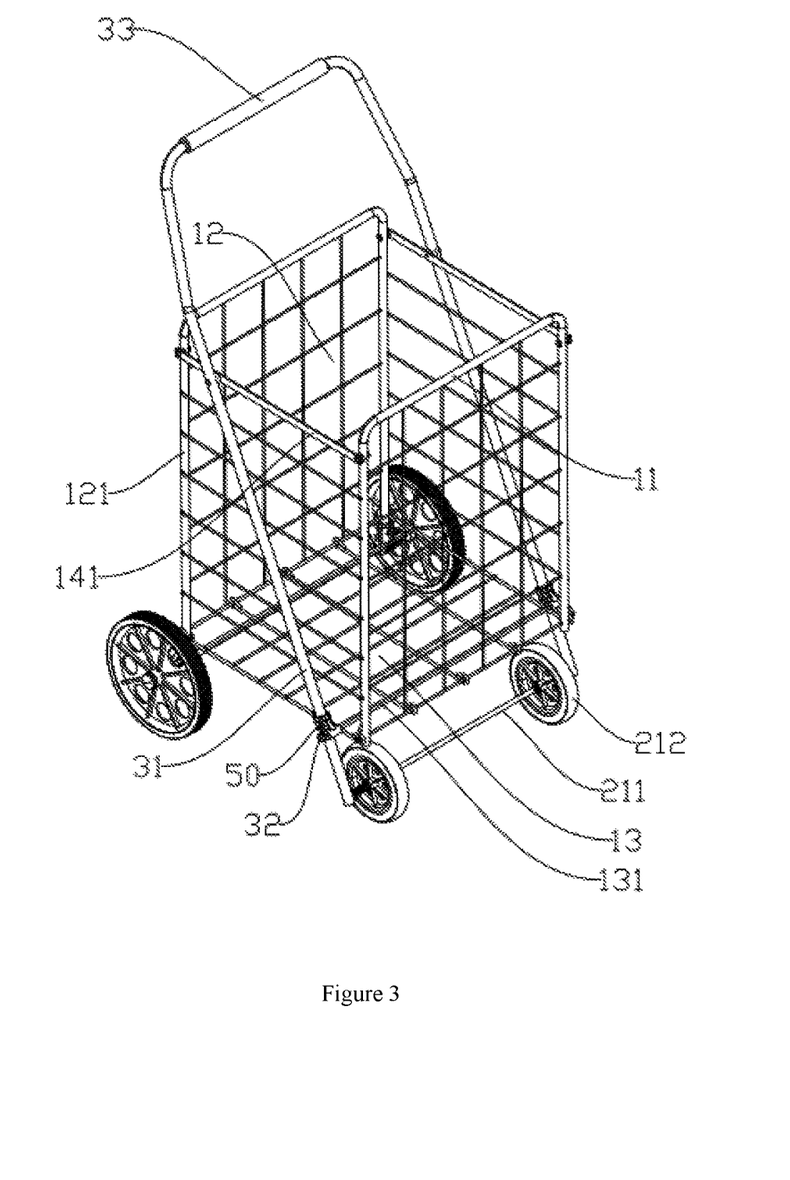
FIG. 3 is a three-dimensional diagram of the present invention.

The sliding wheel comprises a front wheel shaft assembly and a rear wheel assembly, wherein the front wheel shaft assembly comprises a front wheel shaft 211 and front wheels 212 arranged at the two ends of the front wheel shaft 211, and the rear wheel assembly is connected to the bottom end of the shopping cart basket through fixing members 60.

The cart frame comprises two limiting rods 31, a connecting rod 131 and a supporting rod 32 for supporting the shopping cart basket. The supporting rod 32 is arranged underneath the bottom plate 13, and is in contact with the lower surface of the bottom plate 13. The supporting rod 32 is arranged between the two limiting rods 31, and a connecting member 50 for facilitating the rotation of the limiting rod 31 is arranged between the connecting rod 131 and the limiting rod 31. The bottom ends of the two limiting rods 31 are fixedly connected to the front wheel shaft 211, and a rotating pin is connected to the limiting rod 31 and the stop strip 141. It's worth mentioning that the limiting rod 31 is connected to the stop strip 141 located at the uppermost end between the front plate 11 and the back plate 12, thereby facilitating the folding and unfolding of the folding shopping cart. The two ends of the connecting rod 131 are respectively connected to the connecting members 50 at the two ends of the shopping cart basket, and the connecting rod 131 limits the distance between the limiting rods 31 at the two ends of the shopping cart basket, thereby ensuring that the limiting rods 31 can move stably during the folding or unfolding process of the shopping cart.

Figure 4:
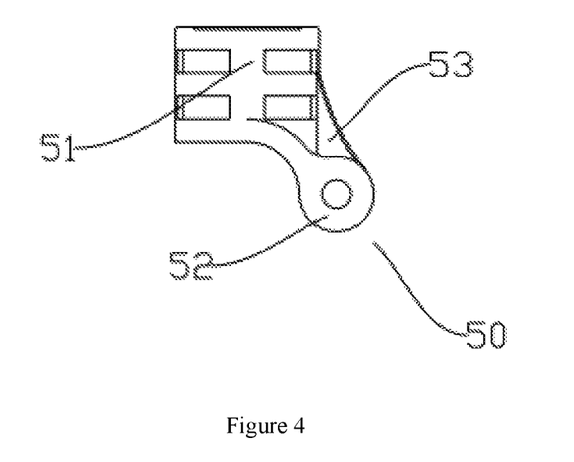
FIG. 4 is a front view of the connecting member of the present invention.
Figure 5:
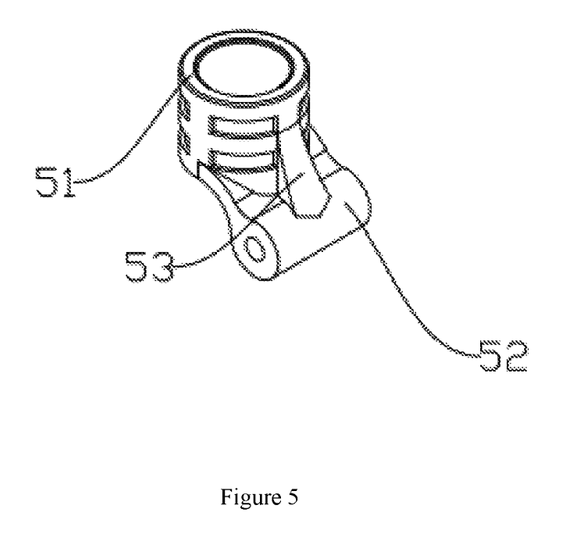
FIG. 5 is a three-dimensional diagram of the connecting member of the present invention.

Specifically, the connecting member 50 is provided with a first connecting sleeve 51 and a second connecting sleeve 52, and the outer wall of the bottom end of the first connecting sleeve 51 is connected with the second connecting sleeve 52. The first connecting sleeve 51 is perpendicular to the second connecting sleeve 52, and the first connecting sleeve 51 is sleeved on the outer wall of the limiting rod 31. The tail ends of the connecting rod 131 are arranged in the second connecting sleeves 52. It should be noted that the tail ends of the connecting rod 131 is the two end portions of the connecting rod, which are respectively arranged in the second connecting sleeves 52 of the connecting members 50 arranged on the two sides. The connecting rod 131 can rotate in the second connecting sleeve 52, and the position where the first connecting sleeve 51 and the second connecting sleeve 52 are connected is arc-shaped for increasing the connection strength. Reinforcing ribs 53 are arranged between the outer wall of the second connecting sleeve 52 and the outer wall of the first connecting sleeve 51, further enhancing the stability between the first connecting sleeve and the second connecting sleeve.

For allowing the shopping cart to be conveniently pushed by a user, a pushing rod 33 is installed at the top end of the two limiting rods, thereby achieving a convenient use.

Figure 6:
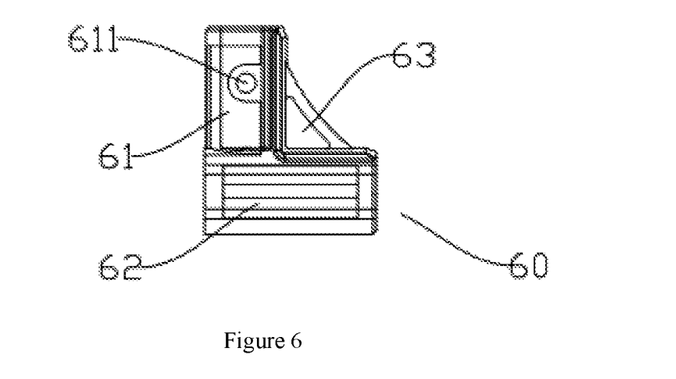
FIG. 6 is a front view of the fixing member of the present invention.
Figure 7:
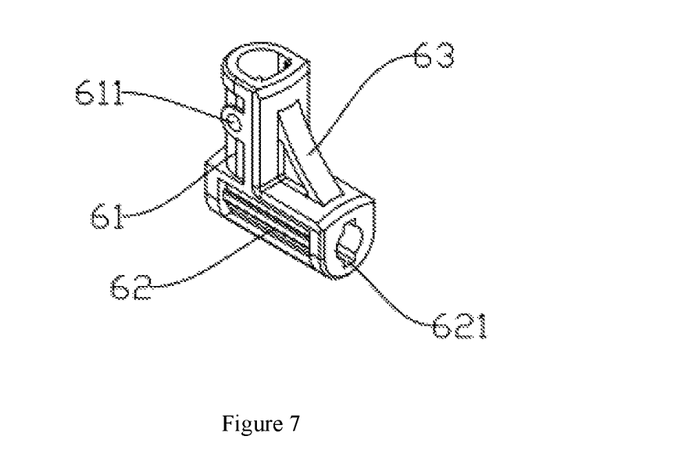
FIG. 7 is a three-dimensional diagram of the fixing member of the present invention.
Figure 8:
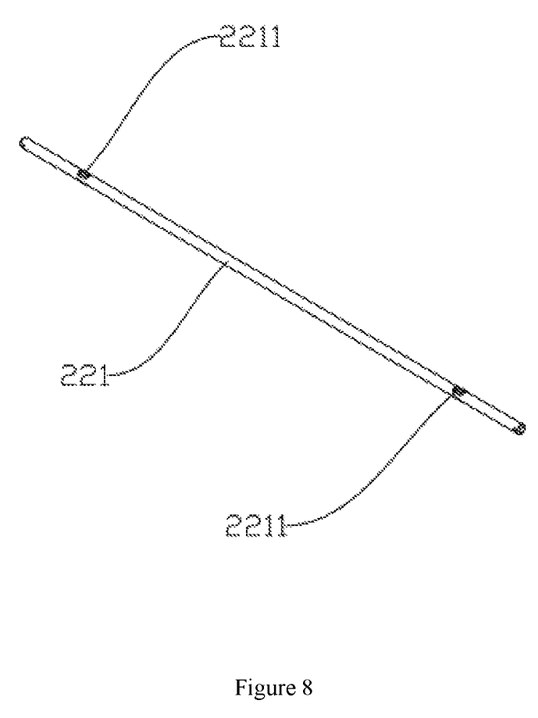
FIG. 8 is a three-dimensional diagram of the rear wheel shaft of the present invention.

Preferably, side stand columns 121 are arranged on the two sides of the back plate 12, and the rear wheel assembly is provided with a rear wheel shaft 221 and rear wheels 222 installed at the two ends of the rear wheel shaft 221. The fixing member 60 comprises a horizontal connecting tube 62 and a vertical connecting tube 61 that is perpendicular to the horizontal connecting tube 62. The horizontal connecting tube 62 is connected to the rear wheel shaft 221, and the vertical connecting tube 61 is connected to the side stand column 121.

When the side stand column 121 is inserted into the vertical connecting tube 61, the side stand column may not be firmly fixed. To solve this problem, a pin hole 611 is formed in the vertical connecting tube 61, and a pin penetrates through the pin hole 611 to fix the side stand column 121 in the vertical connecting tube 61.

A clamping groove 621 is formed in an inner connecting hole of the horizontal connecting tube 62, and the rear wheel shaft 221 is provided with a clamping block 2211 that is arranged in the clamping groove 621 during installation, thus preventing the rear wheel shaft 221 from rotating in the horizontal connecting tube 62. Reinforcing blocks 63 are arranged on the outer walls of the horizontal connecting tube 62 and the vertical connecting tube 61.

When the folding shopping cart of the present invention is folded from an unfolded state, the two ends of the bottom plate 13 are respectively hinged to the bottom end of the front plate 11 and the bottom end of the back plate 12, the included angle between the bottom plate 13 and the front plate 11 is increased, and the included angle between the bottom plate 13 and the back plate 12 is reduced. At this point, the supporting rods 32 rotate in the limiting rods 31 on the two sides, and the limiting rods 31 rotate around the pins. It should be noted that the supporting rod 32 can also be fixedly connected to the limiting rod 31. In this way, the limiting rod 31 slides downwards in the first connecting sleeve 51, the connecting rod 131 moves along with the second connecting sleeve 52, and the connecting rod 131 rotates in the second connecting sleeve 52. The connecting rod 131 and the supporting rod 32 on the limiting rod 31 enable the distance between the limiting rods 31 located at the two ends of the shopping cart to be kept fixed. Thus, the limiting rod 31 can slide stably when sliding in the first connecting sleeve 51. The end portion where the side stand column 121 and the stop strip 141 are connected starts to rotate, and the end portion where the stop strip 141 and the front plate 11 are connected start to rotate. Meanwhile, the front plate 11 rotates upwards around the stop strip 141, and continuously rotates until the bottom plate 13 is attached to the back plate 12. At this point, the shopping cart can no longer be folded continuously, and the folding process is completed.

When the shopping cart needs to be unfolded from a folded state, the reverse rotation can be performed. When the included angle between the bottom plate 13 and the front plate 11 is 90 degrees, the lower surface of the bottom plate 13 is in contact with the supporting rod 32, and the supporting rod restricts the continuous rotation. Thus, the unfolding process is completed.

Compared with the prior art, the present invention has the following advantages:

According to the novel folding shopping cart of the present invention, during the practical use, the connecting member 50 prevents the shopping cart from being unstable when the side surface of the shopping cart is impacted, and the poor use experience caused by objects being hooked during use can be avoided. In the process of using the folding shopping cart of the present invention, the connecting member 50 ensures the stability of the cart frame and the shopping cart basket, and the fixing member 60 ensures the stability of the rear wheels 222 and the shopping cart basket. The assembly is convenient, and the rear wheels can be easily installed without accessories and tools.

Preferred embodiments of the present invention are described in detail above. It should be understood that modifications and alterations can be made by persons of ordinary skill in the art without paying creative labor according to the conception of the present invention. Therefore, the technical solution that can be obtained by those skilled in the art through logic analysis, reasoning or limited experiments on the basis of the prior art based on the present invention are all within the protection scope defined by the claims.

The invention claimed is:

1. A folding shopping cart with a stable structure, comprising:
    a shopping cart basket,
    sliding wheels, and
    a cart frame, wherein the shopping cart basket comprises a front plate (11), a back plate (12) and a bottom plate (13), wherein one end of the bottom plate (13) is hinged to the bottom end of the front plate (11), and the other end of the bottom plate (13) is hinged to the bottom end of the back plate (12), wherein a stop strip (141) is arranged between the side edges of the front plate (11) and the back plate (12), wherein one end of the stop strip (141) is hinged to the front plate (11), and the other end of the stop strip (141) is hinged to the back plate (12), wherein the sliding wheel comprises a front wheel shaft assembly and a rear wheel assembly, wherein the front wheel shaft assembly comprises a front wheel shaft (211) and front wheels (212) arranged at the two ends of the front wheel shaft (211), and the rear wheel assembly is connected to the bottom end of the shopping cart basket through fixing members (60), wherein the cart frame comprises two limiting rods (31), a connecting rod (131) and a supporting rod (32) for supporting the shopping cart basket, wherein the supporting rod (32) is arranged underneath the bottom plate (13), and is in contact with the lower surface of the bottom plate (13), wherein the supporting rod (32) is arranged between the two limiting rods (31), and a connecting member (50) for facilitating the rotation of the limiting rod (31) is arranged between the connecting rod (131) and the limiting rod (31), wherein the bottom ends of the two limiting rods (31) are fixedly connected to the front wheel shaft (211), and a rotating pin is connected to the limiting rod (31) and the stop strip (141), wherein the connecting member (50) is provided with a first connecting sleeve (51) and a second connecting sleeve (52), and the outer wall of the bottom end of the first connecting sleeve (51) is connected with the second connecting sleeve (52).

2. The folding shopping cart with a stable structure of claim 1, wherein the first connecting sleeve (51) is perpendicular to the second connecting sleeve (52), and the first connecting sleeve (51) is sleeved on the outer wall of the limiting rod (31), wherein the tail ends of the connecting rod (131) are arranged in the second connecting sleeves (52).

3. The folding shopping cart with a stable structure of claim 2, wherein the position where the first connecting sleeve (51) and the second connecting sleeve (52) are connected is arc-shaped for increasing the connection strength.

4. The folding shopping cart with a stable structure of claim 2, wherein reinforcing ribs (53) are arranged between the outer wall of the second connecting sleeve (52) and the outer wall of the first connecting sleeve (51).

5. The folding shopping cart with a stable structure of claim 1, wherein a pushing rod (33) is installed at the top end of the two limiting rods.

6. The folding shopping cart with a stable structure of claim 1, wherein side stand columns (121) are arranged on the two sides of the back plate (12), and the rear wheel assembly is provided with a rear wheel shaft (221) and rear wheels (222) installed at the two ends of the rear wheel shaft (221), wherein the fixing member (60) comprises a horizontal connecting tube (62) and a vertical connecting tube (61) that is perpendicular to the horizontal connecting tube (62), wherein the horizontal connecting tube (62) is connected to the rear wheel shaft (221), and the vertical connecting tube (61) is connected to the side stand column (121).

7. The folding shopping cart with a stable structure of claim 6, wherein a pin hole (611) is formed in the vertical connecting tube (61), and a pin penetrates through the pin hole (611) to fix the side stand column (121) in the vertical connecting tube (61).

8. The folding shopping cart with a stable structure of claim 6, wherein a clamping groove (621) is formed in an inner connecting hole of the horizontal connecting tube (62), and the rear wheel shaft (221) is provided with a clamping block (2211) that is arranged in the clamping groove (621) during installation, thus preventing the rear wheel shaft (221) from rotating in the horizontal connecting tube (62).

9. The folding shopping cart with a stable structure of claim 6, wherein reinforcing blocks (63) are arranged on the outer walls of the horizontal connecting tube (62) and the vertical connecting tube (61).

* * * * *